(12) United States Patent
Chang et al.

(10) Patent No.: US 8,320,571 B2
(45) Date of Patent: *Nov. 27, 2012

(54) METHOD FOR GENERATING DOWNLINK FRAME, AND METHOD FOR SEARCHING CELL

(75) Inventors: Kap Seok Chang, Daejeon (KR); Il Gyu Kim, Chungcheongbuk-Do (KR); Hyeong Geun Park, Daejeon (KR); Young Jo Ko, Daejeon (KR); Hyo Seok Yi, Daejeon (KR); Chan Bok Jeong, Daejeon (KR); Young Hoon Kim, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 523 days.

This patent is subject to a terminal disclaimer.

(21) Appl. No.: 12/488,272

(22) Filed: Jun. 19, 2009

(65) Prior Publication Data

US 2009/0252335 A1    Oct. 8, 2009

Related U.S. Application Data

(63) Continuation of application No. PCT/KR2008/004223, filed on Jul. 18, 2008.

(30) Foreign Application Priority Data

| Jul. 20, 2007 | (KR) | ......... 10-2007-0072837 |
| Aug. 21, 2007 | (KR) | ......... 10-2007-0083915 |
| May 8, 2008 | (KR) | ......... 10-2008-0042907 |
| Jul. 1, 2008 | (KR) | ......... 10-2008-0063388 |

(51) Int. Cl.
  *H04K 1/00*   (2006.01)
(52) U.S. Cl. ........ 380/287; 370/350; 370/503; 370/509; 370/208; 370/324; 455/502
(58) Field of Classification Search ............ 370/350, 370/503, 509, 208, 324; 455/502; 380/287
See application file for complete search history.

(56) References Cited

U.S. PATENT DOCUMENTS 6,822,999 B1    11/2004 Lee et al.
(Continued)

FOREIGN PATENT DOCUMENTS

CN    1957539    5/2007
(Continued)

OTHER PUBLICATIONS

ETRI, "Comparison of S-SCH mapping methods," 3GPP TSG WG1 #50bis, R1-074052 (2007).

(Continued)

*Primary Examiner* — April Shan
(74) *Attorney, Agent, or Firm* — Nelson Mullins Riley & Scarborough LLP; EuiHoon Lee, Esq.

(57) ABSTRACT

The present invention relates to a method of generating a downlink frame. The method of generating the downlink frame includes: generating a first short sequence and a second short sequence indicating cell group information; generating a first scrambling sequence and a second scrambling sequence determined by the primary synchronization signal; generating a third scrambling sequence determined by the first short sequence and a fourth scrambling sequence determined by the second short sequence; scrambling the first short sequence with the first scrambling sequence and scrambling the second short sequence with the second scrambling sequence and the third scrambling sequence; scrambling the second short sequence with the first scrambling sequence and scrambling the first short sequence with the second scrambling sequence and the fourth scrambling sequence; and mapping the secondary synchronization signal that includes the first short sequence scrambled with the first scrambling sequence, the second short sequence scrambled with the second scrambling sequence and the third scrambling sequence, the second short sequence scrambled with the first scrambling sequence and the first short sequence scrambled by the second scrambling sequence and the fourth scrambling sequence to a frequency domain.

7 Claims, 7 Drawing Sheets

Secondary synchronization channel of slot 0

Secondary synchronization channel of slot 10

▨ : First sequence
☐ : Second sequence
▧ : Third sequence
▩ : Fourth sequence

U.S. PATENT DOCUMENTS

| | | | |
|---|---|---|---|
| 6,888,880 B2 | 5/2005 | Lee et al. | |
| 7,158,595 B2 | 1/2007 | Yang et al. | |
| 7,161,988 B2 | 1/2007 | Lee et al. | |
| 7,221,695 B1 | 5/2007 | Hwang et al. | |
| 7,236,468 B2 | 6/2007 | Ryu et al. | |
| 7,386,055 B2 | 6/2008 | Morita et al. | |
| 7,969,964 B2* | 6/2011 | Kim et al. | 370/350 |
| 8,125,976 B2* | 2/2012 | Chang et al. | 370/350 |
| 2002/0044538 A1 | 4/2002 | Lee | |
| 2003/0193922 A1 | 10/2003 | Ho et al. | |
| 2005/0088987 A1 | 4/2005 | Ryu | |
| 2006/0062185 A1 | 3/2006 | Darwood et al. | |
| 2006/0114812 A1 | 6/2006 | Kim et al. | |
| 2006/0146867 A1 | 7/2006 | Lee et al. | |
| 2006/0209670 A1 | 9/2006 | Gorokhov et al. | |
| 2008/0019314 A1 | 1/2008 | Gorokhov et al. | |
| 2008/0019350 A1 | 1/2008 | Onggosanusi et al. | |
| 2008/0107086 A1 | 5/2008 | Fukuta et al. | |
| 2008/0212462 A1 | 9/2008 | Ahn et al. | |
| 2008/0273522 A1 | 11/2008 | Luo et al. | |
| 2008/0285433 A1 | 11/2008 | Akita et al. | |
| 2008/0291945 A1 | 11/2008 | Luo | |
| 2009/0067370 A1 | 3/2009 | Kim et al. | |
| 2009/0086669 A1 | 4/2009 | McCoy et al. | |
| 2009/0310782 A1 | 12/2009 | Dabak et al. | |
| 2009/0323642 A1 | 12/2009 | Tanno et al. | |
| 2011/0009138 A1 | 1/2011 | Kim et al. | |

FOREIGN PATENT DOCUMENTS

| | | | |
|---|---|---|---|
| EP | 1453232 A1 | 9/2004 | |
| KR | 1020060037101 | 5/2006 | |
| KR | 1020070025944 | 3/2007 | |
| KR | 1020070039760 | 4/2007 | |
| KR | 1020070050338 | 5/2007 | |
| WO | WO-2005/043791 A2 | 5/2005 | |
| WO | 2006/134829 A1 | 12/2006 | |
| WO | 2007/055526 A1 | 5/2007 | |
| WO | 2007/073116 A1 | 6/2007 | |
| WO | WO-2009/008679 A2 | 1/2009 | |
| WO | WO-2009/014354 A1 | 1/2009 | |

OTHER PUBLICATIONS

ETRI, "S-SCH Scrambling Methods," 3GPP TSG Ran WG1 Meeting #50bis, R1-074053 (2007).

Marvell Semiconductor, "SSCH Mapping to Group ID and Frame Timing," 3GPP TSG RAN WG1 #50bis, R1-074485 (2007).

Motorola, "Scrambling Method for Two S-SCH Short Code," 3GPP TSG RAN WG1 Meeting #49bis, R1-072661 (2007).

NTT DoCoMo, Mitsubishi Electric, Sharp, Toshiba Corporation, "S-SCH Structure for E-UTRA Downlink," 3GPP TSG RAN WG1 Meeting #49, R1-072598 (2007).

ZTE, "Scrambling Method for S-SCH," 3GPP TSG-RAN WG1 #49bis, R1-072910 (2007).

Supplementary European Search Report for Application No. 08778878.2, dated Feb. 15, 2010.

MCC Support, "Draft Report of 3GPP TSG RAN WG1 #49b v0.3.0," 3GPP TSG RAN WG1 Meeting #50, R1-073815, 4 pages (2007).

Motorola, "Cell Search E-mail Reflector Summary," 3GPP TSG RAN1#50, R1-073401, 1 page (2007).

Nortel, "Scrambling Code Designs for S-SCH," 3GPP TSG-RAN WG1 Meeting #50, R1-073307, 6 pages (2007).

ETRI, "Design of S-SCH sequences," 3GPP TSG RAN1 WG1 #49bis, R1-072811, 5 pages (2007).

NTT DoCoMo et al., "S-SCH Structure for E-UTRA Downlink," 3GPP TSG RAN WG1 Meeting #49bis, R1-072941, 6 pages (2007).

NTT DoCoMo et al., "Scrambling Method for S-SCH in E-UTRA Downlink," 3GPP TSG RAN WG1 Meeting #49bis, R1-072940, 4 pages, (2007).

Ericsson, "Information mapping on the Secondary Synchronization Signal," 3GPP TSG-RAN WG 1 Meeting #50, R1-073736, 12 pages, (2007).

LG Electronics, "Time-domain PSC design using Zadoff-Chu sequence," 3GPP TSG RAN WG1 #48 bis, R1-071530, 13 references, (2007).

* cited by examiner

Secondary synchronization channel of slot 0

Secondary synchronization channel of slot 10

▨ : First sequence

▨ : Third sequence

▨ : Second sequence

▨ : Fourth sequence

Secondary synchronization channel of slot 0

Secondary synchronization channel of slot 10

▨ : First sequence

▨ : Third sequence

▨ : Second sequence

▨ : Fourth sequence

Secondary synchronization channel of slot 0

Secondary synchronization channel of slot 10

▨ : First sequence      ▧ : Third sequence
▦ : Second sequence     ▩ : Fourth sequence

METHOD FOR GENERATING DOWNLINK FRAME, AND METHOD FOR SEARCHING CELL

CROSS-REFERENCE TO RELATED APPLICATION

This application is a continuation of PCT application No. PCT/KR2008/004223, filed on Jul. 18, 2008, which claims priority to and the benefit of Korean Patent Application No. 10-2007-0072837 filed on Jul. 20, 2007, Korean Patent Application No. 10-2007-0083915 filed on Aug. 21, 2007, Korean Patent Application No. 10-2008-0042907 filed on May 8, 2008, Korean Patent Application No. 10-2008-0063388 filed on Jul. 1, 2008, the entire contents of which are incorporated herein by reference.

BACKGROUND (a) Field

The present invention relates to a method of generating a downlink frame and a method of searching cells. More particularly, the present invention relates to a method of generating a downlink frame and a method of searching cells by using the downlink frame in an orthogonal frequency division multiplexing (OFDM)-based cellular system.

(b) Description of the Related Art

In a direct sequence code division multiple access (DS-CDMA) system, a sequence hopping method is applied to a pilot channel so as to acquire cell synchronization and unique cell identification information. According to the sequence hopping method, a mobile station easily performs a cell search without a separating synchronization channel by introducing a sequence hopping technology to the pilot channel. However, in the OFDM system, a number of channels that are capable of being distinguished by a frequency domain in a symbol duration of one time domain is greater than that of those that are capable of being distinguished by a spread of CDMA in the symbol duration of one time domain. Accordingly, when only the time domain is used, resources may be wasted in terms of capacity. For this reason, it is inefficient to directly apply the sequence hopping method to the time domain of the pilot channel in the OFDM-based system. Therefore, it is preferable to search the cell by efficiently using received signals in both time domain and frequency domain.

An example of an existing technology for searching a cell in the OFDM system includes a method that allocates synchronization information and cell information by dividing one frame into four time blocks. For the above-described method, two frame structures have been proposed. In a first frame structure, synchronization identification information, cell group identification information, and cell unique identification information are allocated to four time blocks, respectively. In a second frame structure, the synchronization identification information and the cell unique identification information are allocated to a first time block and a third time block, and the synchronization identification information and the cell group identification information are allocated to a second time block and a fourth time block.

According to the first frame structure, since the symbol synchronization is acquired in only the first time block, it is impossible for the mobile station to conduct rapid synchronization acquisition within a prescribed 5 ms during power-on or handover between heterogeneous networks. In addition, it is difficult to acquire diversity gain by accumulating synchronization identification information so as to conduct rapid synchronization acquisition.

According to the second frame structure, the unique cell identification information or the cell group identification information is correlated along with the synchronization acquisition. Therefore, a cell searching process is complex and a rapid cell search is difficult.

As an example of another technology for searching the cell, a method of acquiring the synchronization and searching the cell by using a separate preamble has been proposed. However, this method cannot be applied to a system in which the preamble does not exist. Moreover, the preamble is disposed in front of the frame. Accordingly, in a case in which the mobile station would like to acquire the synchronization at a time location that is not the start of the frame, there is a problem in that it must wait for the next frame. Particularly, the mobile station should acquire initial symbol synchronization within 5 msec during the handover among a GSM mode, a WCDMA mode, and a 3GPP LTE mode, but may acquire the synchronization by a frame unit. For this reason, in some cases, the mobile station cannot acquire the initial symbol synchronization within 5 msec.

As an example of another technology for searching a cell, there is a method of searching the cell by allocating two short sequences to a secondary synchronization channel and by mapping cell ID information to a combination of two short sequences. According to this method, since interference occurs between cells when the same short sequence is allocated to sectors adjacent to each other, there is a problem in that performance in searching cells is reduced.

SUMMARY

The present invention has been made in an effort to provide a method of generating a downlink frame that is capable of averaging interference between sectors and a method of efficiently searching cells by receiving the downlink frame.

An exemplary embodiment of the present invention provides a method of generating a downlink frame, including: generating a first short sequence and a second short sequence indicating cell group information; generating a first scrambling sequence and a second scrambling sequence determined by the primary synchronization signal; generating a third scrambling sequence determined by the first short sequence and a fourth scrambling sequence determined by the second short sequence; scrambling the first short sequence with the first scrambling sequence and scrambling the second short sequence with the second scrambling sequence and the third scrambling sequence; scrambling the second short sequence with the first scrambling sequence and scrambling the first short sequence with the second scrambling sequence and the fourth scrambling sequence; and mapping the secondary synchronization signal that includes the first short sequence scrambled with the first scrambling sequence, the second short sequence scrambled with the second scrambling sequence and the third scrambling sequence, the second short sequence scrambled with the first scrambling sequence and the first short sequence scrambled with the second scrambling sequence and the fourth scrambling sequence to a frequency domain.

Another embodiment of the present invention provides an apparatus for generating a downlink frame including: a sequence generating unit that generates a first short sequence and a second short sequence indicating cell group information, a first scrambling sequence and a second scrambling sequence determined by the primary synchronization signal, a third scrambling sequence determined by the first short sequence and a fourth scrambling sequence determined by the second short sequence; and a synchronization signal generating unit that scrambles the first short sequence with the first scrambling sequence and scrambles the second short sequence with the second scrambling sequence and the third scrambling sequence to generate one secondary synchronization signal, and scrambles the second short sequence with the first scrambling sequence and scrambles the first short sequence with the second scrambling sequence and the fourth scrambling sequence to generate the other secondary synchronization signal.

Yet another embodiment of the present invention provides a method of searching a cell, including: receiving a downlink frame including a primary synchronization signal and two secondary synchronization signal which are different from each other; and estimating information of a cell by using the primary synchronization signal and the two secondary synchronization signal. In this case, in one secondary synchronization signal of the two secondary synchronization signal, a first short sequence scrambled with a first scrambling sequence and a second short sequence scrambled with a second scrambling sequence and a third scrambling sequence are alternately disposed on a plurality of sub-carriers, in the other secondary synchronization signal of the two secondary synchronization signal, a second short sequence scrambled with a first scrambling sequence and a first short sequence scrambled with a second scrambling sequence and a fourth scrambling sequence are alternately disposed on a plurality of sub-carriers, and the first short sequence and the second short sequence indicate cell group information, the first scrambling sequence and the second scrambling sequence are determined by the primary synchronization signal, the third scrambling sequence is determined by the first short sequence, and the fourth scrambling sequence is determined by the second short sequence.

Still another embodiment of the present invention provides an apparatus for searching a cell, including: a receiving unit that receives a downlink frame including a primary synchronization signal and two secondary synchronization signals which are different from each other; a cell group estimating unit that identifies a cell group by using the two secondary synchronization signal; and a cell estimating unit that identifies a cell in the cell group by using the primary synchronization signal. In this case, in one secondary synchronization signal of the two secondary synchronization signal, a first short sequence scrambled with a first scrambling sequence and a second short sequence scrambled with a second scrambling sequence and a third scrambling sequence are alternately disposed on a plurality of sub-carriers, and in the other secondary synchronization signal of the two secondary synchronization signal, a second short sequence scrambled with a first scrambling sequence and a first short sequence scrambled with a second scrambling sequence and a fourth scrambling sequence are alternately disposed on a plurality of sub-carriers, and the first short sequence and the second short sequence indicate cell group information, the first scrambling sequence and the second scrambling sequence are determined by the primary synchronization signal, the third scrambling sequence is determined by the first short sequence and the fourth scrambling sequence is determined by the second short sequence.

Still another embodiment of the present invention provides a recording medium that records a program for executing the method of generating the downlink frame. The recording medium records a program including: generating a first short sequence and a second short sequence indicating cell group information; generating a first scrambling sequence and a second scrambling sequence determined by the primary synchronization signal; generating a third scrambling sequence determined by the first short sequence and a fourth scrambling sequence determined by the second short sequence; scrambling the first short sequence with the first scrambling sequence and scrambling the second short sequence with the second scrambling sequence and the third scrambling sequence; scrambling the second short sequence with the first scrambling sequence and scrambling the first short sequence with the second scrambling sequence and the fourth scrambling sequence; and mapping the secondary synchronization signal that includes the first short sequence scrambled with the first scrambling sequence and the second short sequence scrambled with the second scrambling sequence and the third scrambling sequence, the second short sequence scrambled with the first scrambling sequence and the first short sequence scrambled with the second scrambling sequence and the fourth scrambling sequence to a frequency domain.

According to the above-mentioned present invention, interference between sectors can be reduced by scrambling the short sequences due to the scrambling sequences, thereby improving performance for searching cells.

DETAILED DESCRIPTION

Figure 1:
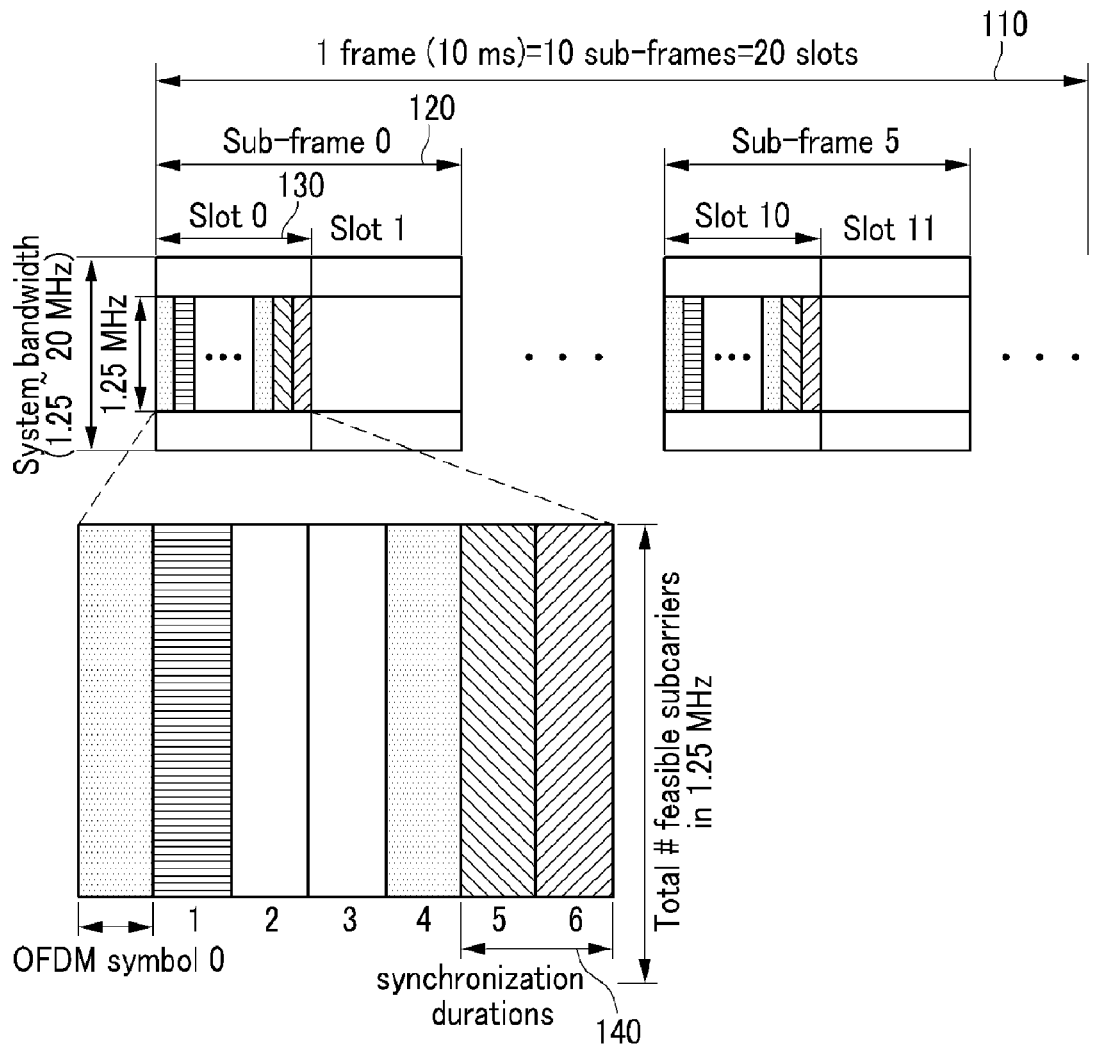
FIG. 1 is a diagram illustrating a downlink frame in an OFDM system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. In addition, parts that are irrelevant to the description of the present invention are omitted in the drawings, to clarify the present invention. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the term "unit" described in the specification means a unit for processing at least one function and operation, and can be implemented by hardware components or software components and combinations thereof.

First, referring to FIGS. 1 to 3, a downlink frame of an OFDM system and a configuration of a synchronization channel according to an exemplary embodiment of the present invention will be described.

FIG. 1 is a diagram illustrating a downlink frame of an OFDM system according to an exemplary embodiment of the present invention. In FIG. 1, a horizontal axis represents a time axis and a vertical axis represents a frequency axis or sub-carrier axis.

As shown in FIG. 1, a downlink frame 110 according to the exemplary embodiment of the present invention has a time duration of 10 msec and includes ten sub-frames 120. Each sub-frame 120 has a time duration of 1 msec and includes two slots 130. Each slot 130 includes six or seven OFDM symbols. The length of a cyclic prefix in a case in which one slot includes six symbols is greater than that of a cyclic prefix in a case in which one slot includes seven symbols.

As shown in FIG. 1, the downlink frame 110 according to the exemplary embodiment of the present invention includes two synchronization durations 140 in total, including synchronization durations 140 in slot No. 0 and slot No. 10, respectively. However, it is not necessarily limited thereto. The downlink frame 110 may include a synchronization duration in any slot, and may include one synchronization duration or three or more synchronization durations. Since the length of the cyclic prefix may be different in each slot, it is preferable that the synchronization duration is located at an end of the slot.

Each slot includes a pilot duration.

The synchronization duration according to the exemplary embodiment of the present invention includes a primary synchronization channel and a secondary synchronization channel, and the primary synchronization channel and the secondary synchronization channel are disposed so as to be adjacent to each other in view of time. As shown in FIG. 1, the primary synchronization channel is located at the end of the slot, and the secondary synchronization channel is located right ahead of the primary synchronization channel.

The primary synchronization channel includes a primary synchronization signal having information for identifying symbol synchronization and frequency synchronization, and some information for cell identification (ID). The secondary synchronization channel includes a secondary synchronization signal having remaining information for the cell ID, and information for identifying frame synchronization. A mobile station identifies the cell ID of cell by combining the cell ID information of the primary synchronization channel and the cell ID information of the secondary synchronization channel.

For instance, assuming that the total number of cell IDs is 510, if three identification sequences are allocated to the primary synchronization channel to divide all 510 cell IDs into three groups and if 170 sequences are allocated to the secondary synchronization channel (3×170=510), the information on all of the 510 cell IDs can be represented.

Another method is that the 510 cell IDs are divided into 170 groups by using 170 secondary synchronization signals that are allocated to the secondary synchronization channel, and information on cell IDs in each cell group can be represented by three primary synchronization signals that are allocated to the primary synchronization channel.

Since the secondary synchronization channel includes the information for identifying the frame synchronization as well as information for the cell ID, two secondary synchronization channels included in one frame are different from each other.

Figure 2:
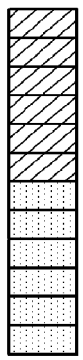
FIG. 2 is a diagram illustrating a configuration of a secondary synchronization channel when two sequences are mapped to a frequency domain in a localization form.
Figure 2:
Figure 3:
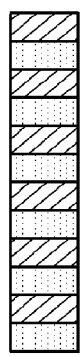
FIG. 3 is a diagram illustrating a configuration of a secondary synchronization channel when two sequences are mapped to a frequency domain in a distribution form.
Figure 3:

FIG. 2 is a diagram illustrating a configuration of a secondary synchronization channel when two short sequences are mapped to a frequency domain in a localization form, and FIG. 3 is a diagram illustrating a configuration of a secondary synchronization channel when two short sequences are mapped to a frequency domain in a distribution form.

Referring to FIG. 2 to FIG. 3, a secondary synchronization signal, which is inserted into a secondary synchronization channel, according to an exemplary embodiment of the present invention is formed by combining two short sequences. Cell group information and frame synchronization information are mapped to the two short sequences.

As shown in FIG. 2, a first short sequence may be locally allocated to sub-carriers, and then the second short sequence may be locally allocated to remaining sub-carriers. In addition, as shown in FIG. 3, the first short sequence may be allocated to every even-numbered sub-carriers (n=0, 2, 4, . . . , 60), and the second short sequence may be allocated to every odd-numbered sub-carrier (n=1, 3, 5, . . . , 61).

The short sequence length corresponds to half of the number of sub-carriers allocated to the secondary synchronization channel. That is, the number of short sequence elements that can be generated is up to half of the number of sub-carriers allocated to the secondary synchronization channel. For instance, when the number of sub-carriers allocated to the secondary synchronization channel is 62, the short sequence length corresponds to 31 and the number of short sequence elements that can be generated is up to 31.

Since two short sequences are allocated to each secondary synchronization channel, the number of secondary synchronization sequences generated by a combination of two short sequences is 961 (=31×31) at maximum. However, since the information that should be included in the secondary synchronization channel is cell group information and frame boundary information, 170 or 340 (=170×2) secondary synchronization sequences are required. Accordingly, the number 961 is a sufficiently large value in comparison with the number 170 or 340.

Figure 4:
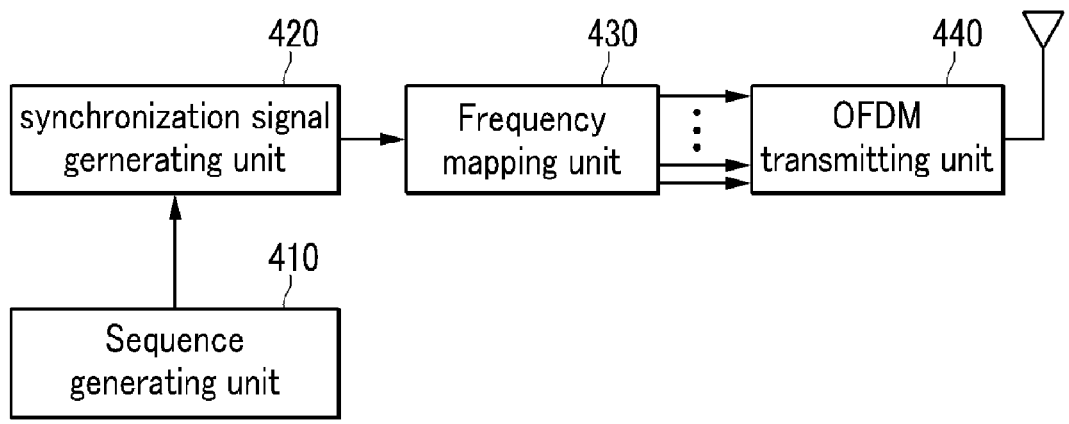
FIG. 4 is a block diagram of an apparatus for generating a downlink frame according to the exemplary embodiment of the present invention.

Next, an apparatus for generating a downlink frame according to an exemplary embodiment of the present invention will be described with reference to FIG. 4. FIG. 4 is a block diagram of the apparatus for generating the downlink frame according to the exemplary embodiment of the present invention.

As shown in FIG. 4, the apparatus for generating the downlink frame according to the exemplary embodiment of the present invention includes a sequence generating unit 410, a synchronization signal generating unit 420, a frequency mapping unit 430, and an OFDM transmitting unit 440.

The sequence generating unit 410 generates a sequence for acquiring time and frequency synchronization, a cell identification sequence, a plurality of short sequences, and a scrambling sequence for reducing adjacent cell interference, respectively, and transmits them to the synchronization signal generating unit 420.

The synchronization signal generating unit 420 generates a primary synchronization signal, a secondary synchronization signal, and a pilot pattern by using sequences received from the sequence generating unit 410.

The synchronization signal generating unit 420 generates the primary synchronization signal by using the sequence for acquiring time and frequency synchronization and the cell identification sequence. In addition, the synchronization signal generating unit 420 generates the secondary synchronization signal by using the plurality of short sequences and the scrambling sequences for reducing adjacent cell interference.

The synchronization signal generating unit 420 generates the pilot pattern of downlink signals by allocating a unique scrambling sequence allocated to each cell for encoding a common pilot symbol and data symbol of a cellular system to the pilot channel.

The frequency mapping unit 430 generates the downlink frame by mapping the primary synchronization signal, the secondary synchronization signal, and the pilot pattern that are generated from the synchronization signal generating unit 420 and frame control information and transmission traffic data that are transmitted from external sources to the time and frequency domains.

The OFDM transmitting unit 440 receives the downlink frame from the frequency mapping unit 430 and transmits the downlink frame through given transmission antenna.

Figure 5:
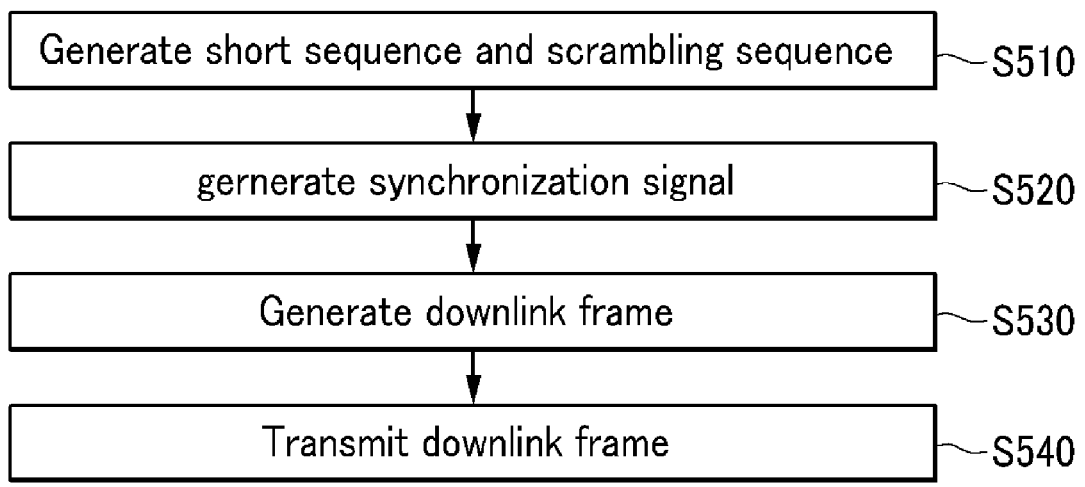
FIG. 5 is a flowchart illustrating a method of generating a downlink frame according to the exemplary embodiment of the present invention.

Referring to FIG. 5 to FIG. 8, a method of generating a downlink frame according to an exemplary embodiment of the present invention will be described. FIG. 5 is a flowchart illustrating the method of generating the downlink frame according to the exemplary embodiment of the present invention.

As shown in FIG. 5, the sequence generating unit 410 generates a plurality of short sequences and a plurality of scrambling sequences for reducing interference of a plurality of adjacent cells and transmits them to the synchronization signal generating unit 420 (S510).

The synchronization signal generating unit 420 generates a secondary synchronization signal by using the short sequences and the scrambling sequences for reducing interference of the plurality of adjacent cells received from the sequence generating unit 410 (S520). In the exemplary embodiment of the present invention, it is described that one frame includes two secondary synchronization channels. However, it is not limited thereto.

Figure 6:
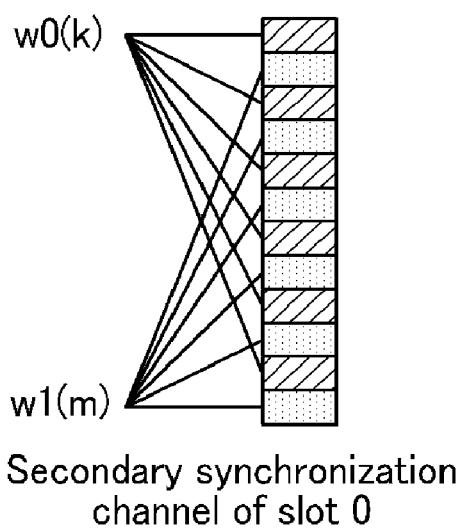
FIG. 6 is a diagram illustrating a first method of generating a secondary synchronization signal according to the exemplary embodiment of the present invention.
Figure 6:
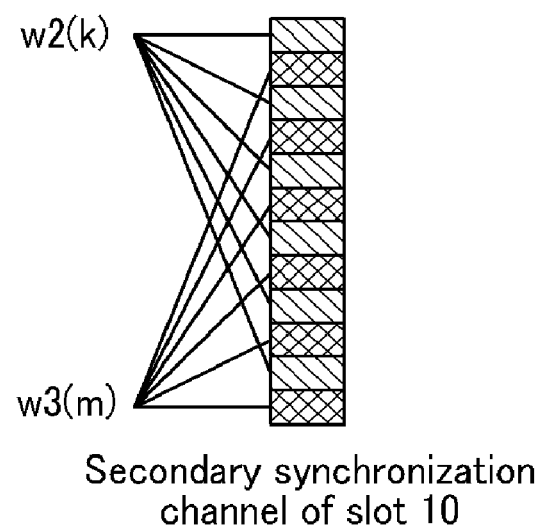
Figure 7:
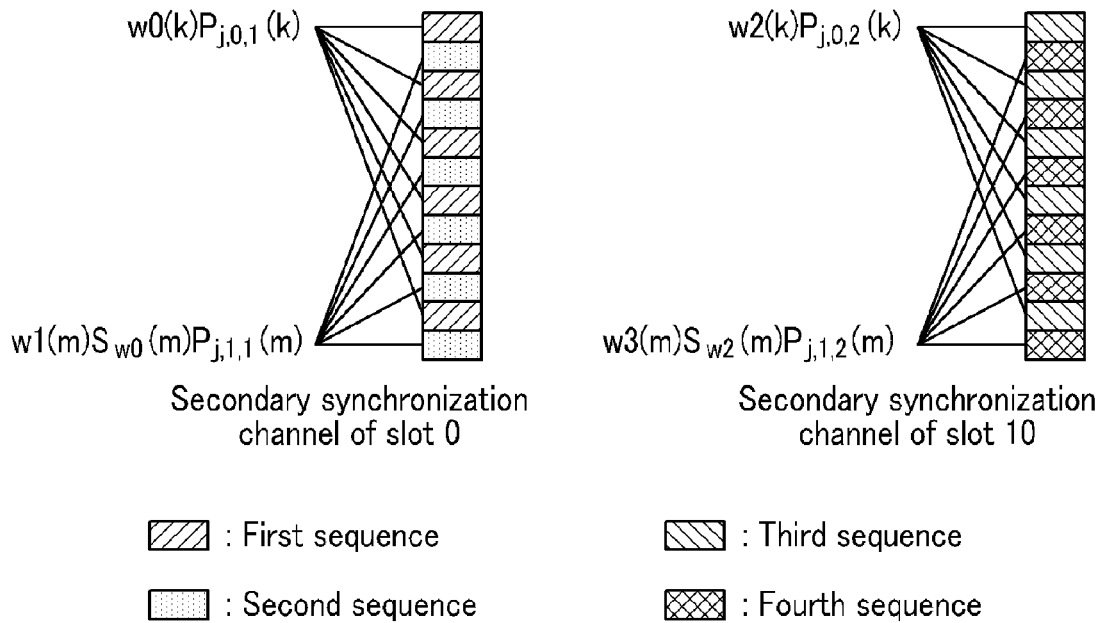
FIG. 7 is a diagram illustrating a second method of generating a secondary synchronization signal according to the exemplary embodiment of the present invention.
Figure 8:
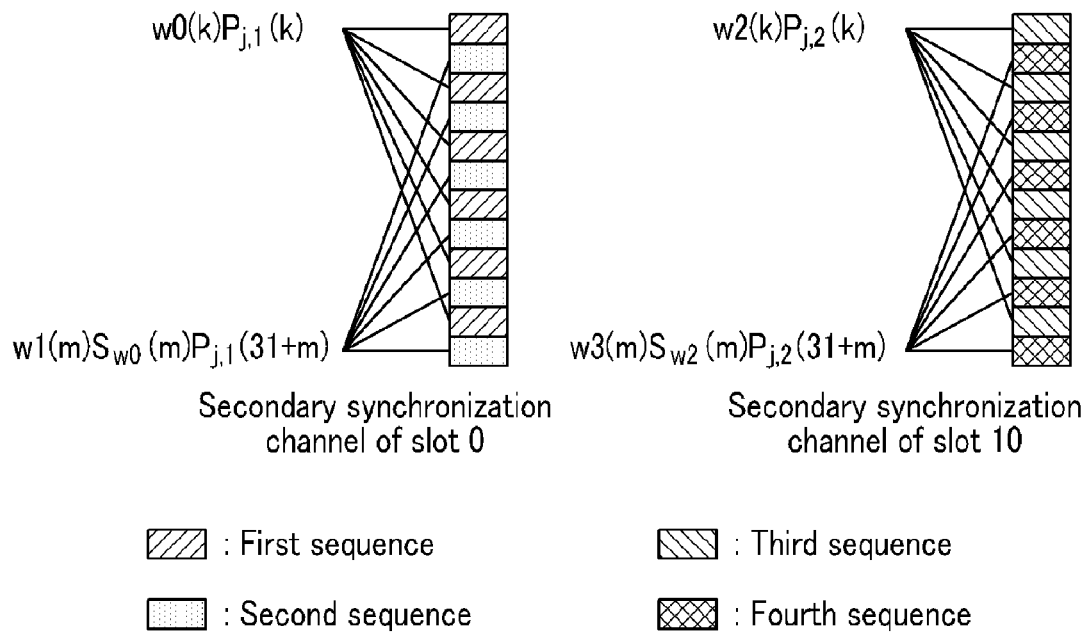
FIG. 8 is a diagram illustrating a third method of generating a secondary synchronization signal according to the exemplary embodiment of the present invention.

Referring to FIG. 6 to FIG. 8, three different methods of generating a secondary synchronization signal according to an exemplary embodiment of the present invention will be described. FIG. 6 is a diagram illustrating the first method of generating a secondary synchronization signal according to the exemplary embodiment of the present invention, FIG. 7 is a diagram illustrating the second method of generating a secondary synchronization signal according to the exemplary embodiment of the present invention, and FIG. 8 is a diagram illustrating the third method of generating a secondary synchronization signal according to the exemplary embodiment of the present invention.

A short sequence (wn) is a binary sequence (or binary code) representing cell group information. That is, the short sequence (wn) is the binary sequence allocated to a cell group number and frame synchronization. Moreover, the length of the short sequence corresponds to half of the number of sub-carriers allocated to the secondary synchronization channel. In the exemplary embodiment of the present invention, it is described that the number of sub-carriers allocated to the secondary synchronization channel is 62. However, it is not limited thereto. Accordingly, the short sequence length according to the exemplary embodiment of the present invention is 31.

The first short sequence w0 is allocated to even-numbered sub-carriers of the first secondary synchronization channel and is defined as given in Equation 1.

$$w0 = [w0(0), w0(1), \ldots, w0(k), \ldots, w0(30)] \quad \text{(Equation 1)}$$

Here, k denotes an index of the even-numbered sub-carriers used for a secondary synchronization channel.

The second short sequence w1 is allocated to odd-numbered sub-carriers of the first secondary synchronization channel and is defined as given in Equation 2.

$$w1 = [w1(0), w1(1), \ldots, w1(m), \ldots, w1(30)] \quad \text{(Equation 2)}$$

Here, m denotes an index of the odd-numbered sub-carriers used for the secondary synchronization channel.

The third short sequence w2 is allocated to even-numbered sub-carriers of the second secondary synchronization channel and is defined as given in Equation 3.

$$w2 = [w2(0), w2(1), \ldots, w2(k), \ldots, w2(30)] \quad \text{(Equation 3)}$$

The fourth short sequence w3 is allocated to odd-numbered sub-carriers of the second secondary synchronization channel and is defined as given in Equation 4.

$$w3 = [w3(0), w3(1), \ldots, w3(m), \ldots, w3(30)] \quad \text{(Equation 4)}$$

Here, the short sequences w0, w1, w2, and w3 may be different sequences. In addition, the relationship between the short sequences w0, w1, w2, and w3 may be represented as w0=w3 and w1=w2 (or w0=w2 and w1=w3). Given that w0=w3 and w1=w2, then the pattern of short sequences allocated to the second secondary synchronization channel can be determined only through the pattern of short sequences allocated to the first secondary synchronization channel. Accordingly, by storing only 170 secondary synchronization sequences generated by a combination of two short sequences allocated to the first secondary synchronization channel, a mobile station can reduce the complexity needed to obtaining the cell group information and frame boundary information.

According to the first method of generating a secondary synchronization signal as shown in FIG. 6, the first short sequence is allocated to every even-numbered sub-carrier of the first secondary synchronization channel and the second short sequence is allocated to every odd-numbered sub-carrier of the first secondary synchronization channel. In addition, the third short sequence is allocated to every even-numbered sub-carrier of the second secondary synchronization channel and the fourth short sequence is allocated to every odd-numbered sub-carrier of the second secondary synchronization channel.

According to the first method of generating the secondary synchronization signal, the secondary synchronization signal is formed by a combination of two short sequences having the length of 31. Accordingly, the number of secondary synchronization signals is 961 which is a sufficiently large value in comparison with the number 170 or 340.

According to the second method of generating the secondary synchronization signal shown in FIG. 7, a first sequence determined by Equation 5 is allocated to every even-numbered sub-carrier of the first secondary synchronization channel(slot 0), and a second sequence determined by Equation 6 is allocated to every odd-numbered sub-carrier of the first secondary synchronization channel(slot 0). In addition, a third sequence determined by Equation 7 is allocated to every even-numbered sub-carrier of the second secondary synchronization channel(slot 10), and a fourth sequence determined by Equation 8 is allocated to every odd-numbered sub-carrier of the second secondary synchronization channel(slot 10).

A scrambling sequence $P_{j,0,1}$ scrambling the first short sequence w0 is defined by $P_{j,0,1} = [P_{j,0,1}(0), P_{j,0,1}(1), \ldots, P_{j,0,1}(k), \ldots, P_{j,0,1}(30)]$, where j (j=0, 1, 2) is the number of the cell identification sequence allocated to the primary synchronization channel. Accordingly, the scrambling sequence $P_{j,0,1}$ is determined by the primary synchronization signal. The scrambling sequence $P_{j,0,1}$ is a known value when a sequence is demapped to find a cell ID group and a frame boundary in the mobile station.

As indicated in Equation 5, each element of a first sequence $c_0$ according to the second method of generating the secondary synchronization signal is a product of each element of the first short sequence w0 and each element of the scrambling sequence $P_{j,0,1}$ corresponding thereto.

$$c_0 = [w0(0)P_{j,0,1}(0), w0(1)P_{j,0,1}(1), \ldots, w0(k)P_{j,0,1}(k), \ldots, w0(30)P_{j,0,1}(30)] \quad \text{(Equation 5)}$$

Here, k denotes an index of the even-numbered sub-carriers used for the secondary synchronization channel.

The scrambling sequence scrambling the second short sequence w1 is $P_{j,1,1}$ and $S_{w0}$.

The scrambling sequence $P_{j,1,1}$ is $P_{j,1,1} = [P_{j,1,1}(0), P_{j,1,1}(1), \ldots, P_{j,1,1}(m), \ldots, P_{j,1,1}(30)]$, where j (j=0, 1, 2) is the number of the cell identification sequence allocated to the primary synchronization channel. Accordingly, the scrambling sequence $P_{j,1,1}$ is determined by the primary synchronization signal. In addition, the scrambling sequence $P_{j,1,1}$ may be the same as the scrambling sequence $P_{j,0,1}$ or may be different from the scrambling sequence $P_{j,0,1}$. When the scrambling sequence $P_{j,1,1}$ is different from the scrambling sequence $P_{j,0,1}$, it can be possible to reduce interference.

The scrambling sequence $P_{j,1,1}$ is a previously known value when a sequence is demapped to find a cell ID group and a frame boundary in the mobile station.

In addition, the scrambling sequence $S_{w0}$ is $S_{w0} = [S_{w0}(0), S_{w0}(1), \ldots, S_{w0}(m), \ldots, S_{w0}(30)]$, and the scrambling sequence $S_{w0}$ is determined by the first short sequence w0.

At this time, a plurality of short sequences are grouped into a plurality of short sequence group and the $S_{w0}$ may be determined by a short sequence group to which the first short sequence is assigned by grouping short sequences.

For example, according to the exemplary embodiment of the present invention, since the length of the first short sequence is 31, there are 31 short sequences. Accordingly, by assigning the short sequences Nos. 0-7 to the group 0, the short sequences Nos. 8-15 to the group 1, the short sequences Nos. 16-23 to the group 2, and the short sequences Nos. 24-30 to the group 3. Accordingly $S_{w0}$ is determined by mapping a length-31 scrambling code to the group to which the first short sequence number is assigned.

Furthermore, 31 short sequences may be classified into eight groups by grouping the numbers of the first short sequences having the identical remainder when we divide each number of short sequences by 8. That is, by assigning the short sequence number having the remainder of 0 when dividing the short sequence numbers by 8 to the group 0, the short sequence having the remainder of 1 when dividing the short sequence numbers by 8 to the group 1, the short sequence having the remainder of 2 when dividing the short sequence numbers by 8 to the group 2, the short sequence having the remainder of 3 when dividing the short sequence numbers by 8 to the group 3, the short sequence having the remainder of 4 when dividing the short sequence numbers by 8 to the group 4, the short sequence having the remainder of 5 when dividing the short sequence numbers by 8 to the group 5, the short sequence having the remainder of 6 when dividing the short sequence numbers by 8 to the group 6, and the short sequence having the remainder of 7 when dividing the short sequence numbers by 8 to the group 7. Accordingly $S_{w0}$ is determined by mapping a length-31 scrambling code to the group to which the first short sequence number is assigned.

As indicated in Equation 6, each element of a second sequence $c_1$ according to the second method of generating the secondary synchronization signal is a product of each element of the second short sequence w1 and each element of the scrambling sequences $P_{j,1,1}$ and $S_{w0}$ corresponding thereto.

$$c_1 = [w1(0)S_{w0}(0)P_{j,1,1}(0), w1(1)S_{w0}(1)P_{j,1,1}(1), \ldots, w1(m)S_{w0}(m)P_{j,1,1}(m), \ldots, w1(30)S_{w0}(30)P_{j,1,1}(30)] \quad \text{(Equation 6)}$$

Herein, m denotes the index of odd-numbered sub-carriers used for the secondary synchronization channel.

A scrambling sequence $P_{j,0,2}$ for scrambling a third short sequence w2 is $P_{j,0,2} = [P_{j,0,2}(0), P_{j,0,2}(1), \ldots, P_{j,0,2}(k) \ldots, P_{j,0,2}(30)]$, where j (j=0, 1, 2) is the number of the cell identification sequence allocated to the primary synchronization channel. Accordingly, the scrambling sequence $P_{j,0,2}$ is determined by the primary synchronization signal. In addition, the scrambling sequence $P_{j,0,2}$ is a previously known value when the sequence is demapped to find the cell ID group and frame boundary in the mobile station.

As indicated in Equation 7, each element of a third sequence $c_2$ according to the second method of generating the secondary synchronization signal is a product of each element of the third short sequence w2 and each element of the scrambling sequence $P_{j,0,2}$ corresponding thereto.

$$c_2 = [w2(0)P_{j,0,2}(0), w2(1)P_{j,0,2}(1), \ldots, w2(k)P_{j,0,2}(k), \ldots, w2(30)P_{j,0,2}(30)] \quad \text{(Equation 7)}$$

Herein, k denotes the index of even-numbered sub-carriers used for the secondary synchronization channel.

Scrambling sequences for scrambling a fourth short sequence are $P_{j,1,2}$ and $S_{w2}$.

The scrambling sequence $P_{j,1,2}$ is $P_{j,1,2} = [P_{j,1,2}(0), P_{j,1,2}(1), \ldots, P_{j,1,2}(m), P_{j,1,2}(30)]$, and j (j=0, 1, 2) is the number of the cell identification sequence allocated to the primary synchronization channel. Accordingly, the scrambling sequence $P_{j,1,2}$ is determined by the primary synchronization signal. The scrambling sequence $P_{j,1,2}$ is a previously known value when a sequence is demapped to find the cell ID group and frame boundary in the mobile station.

Furthermore, the scrambling sequence $S_{w2}$ is $S_{w2} = [S_{w2}(0), S_{w2}(1), S_{w2}(m), \ldots, S_{w2}(30)]$, and the scrambling sequence $S_{w2}$ is determined by the third short sequence w2.

At this time, the $S_{w2}$ may be determined by a short sequence group to which the third short sequence is assigned by grouping short sequences.

For example, according to the exemplary embodiment of the present invention, since the length of the third short sequence is 31 as well, there are 31 short sequences. Accordingly, by assigning the short sequences Nos. 0-7 to the group 0, the short sequences Nos. 8-15 to the group 1, the short sequences Nos. 16-23 to the group 2, and the short sequences Nos. 24-30 to the group 3. Accordingly $S_{w2}$ is determined by mapping a length-31 scrambling code to the group to which the third short sequence number is assigned.

Furthermore, 31 short sequences may be classified into eight groups by grouping the numbers of the third short sequences having the identical remainder when we divide each number of short sequences by 8. That is, by assigning the short sequence number having the remainder of 0 when dividing the short sequence numbers by 8 to the group 0, the short sequence having the remainder of 1 when dividing the short sequence numbers by 8 to the group 1, the short sequence having the remainder of 2 when dividing the short sequence numbers by 8 to the group 2, the short sequence having the remainder of 3 when dividing the short sequence numbers by 8 to the group 3, the short sequence having the remainder of 4 when dividing the short sequence numbers by 8 to the group 4, the short sequence having the remainder of 5 when dividing the short sequence numbers by 8 to the group 5, the short sequence having the remainder of 6 when dividing the short sequence numbers by 8 to the group 6, and the short sequence having the remainder of 7 when dividing the short sequence numbers by 8 to the group 7. Accordingly $S_{w2}$ is determined by mapping a length-31 scrambling code to the group to which the third short sequence number is assigned.

As indicated in Equation 8, each element of a fourth sequence $c_3$ according to the second method of generating the secondary synchronization signal is a product of each element of the fourth short sequence w3 and each element of the scrambling sequences $P_{j,1,2}$ and $S_{w2}$ corresponding thereto.

$$c_3 = [w3(0)S_{w2}(0)P_{j,1,2}(0), w3(1)S_{w2}(1)P_{j,1,2}(1), \ldots, w3(m)S_{w2}(m)P_{j,1,2}(m), \ldots, w3(30)S_{w2}(30)P_{j,1,2}(30)] \quad \text{(Equation 8)}$$

Herein, m denotes the index of odd-numbered sub-carriers used for the secondary synchronization channel.

Here, the relationship between the scrambling sequences and the short sequences may be set as $P_{j,0,1} = P_{j,0,2}$, $P_{j,1,1} = P_{j,1,2}$, $P_{j,0,1} \neq P_{j,1,1}$, $P_{j,0,2} \neq P_{j,1,2}$, and w0≠w1≠w2≠w3 (or w0=w3 and w1=w2). In this case, the cell group and frame identify information are mapped to the combination of the first to fourth short sequences, and the number of descrambling hypotheses in the mobile station with respect to the scrambling of secondary synchronization channel determined by the cell identification sequence number of the primary synchronization channel is reduced to 3.

Furthermore, the relationship between the scrambling sequences and the short sequences may be set as $P_{j,0,1} \neq P_{j,0,2}$, $P_{j,1,1} \neq P_{j,1,2}$, $P_{j,0,1} \neq P_{j,1,1}$, $P_{j,0,2} \neq P_{j,1,2}$, w0=w2, and w1=w3. In this case, the cell group information is mapped to the combination of the first short sequence and the second short sequence, and the frame synchronization information is mapped to the scrambling sequences ($P_{j,0,1}$, $P_{j,0,2}$, $P_{j,1,1}$, $P_{j,1,2}$) of the secondary synchronization channel determined by the cell identification sequence number of the primary synchronization channel. Then, the number of descrambling hypotheses of the mobile station with respect to the scrambling of the secondary synchronization channel determined by the cell identification sequence number of the primary synchronization channel is increased to 6. However, the combination number of the cell group identification sequences is reduced to half, and the number of descrambling hypotheses of the mobile station with respect to the scrambling determined by the first and third short sequences is also reduced to half.

As shown in FIG. 8, in the third method of generating a secondary synchronization signal, a first sequence determined by Equation 9 is allocated to every even-numbered sub-carrier of a first secondary synchronization channel, and a second sequence determined by Equation 10 is allocated to every odd-numbered sub-carrier of the first secondary synchronization channel. Moreover, a third sequence determined by Equation 11 is allocated to every even-numbered sub-carrier of a second secondary synchronization channel, and a fourth sequence determined by Equation 12 is allocated to every odd-numbered sub-carrier of the second secondary synchronization channel.

That is, according to the second method of generating the secondary synchronization signal, the first short sequence is scrambled with a first scrambling sequence having the length of 31, which is determined by the cell identification sequence allocated to the primary synchronization channel, and the second short sequence is scrambled with a second scrambling sequence having the length of 31, which is determined by the cell identification sequence allocated to the primary synchronization channel. However, according to the third method of generating the secondary synchronization signal, the first short sequence and the second short sequence are scrambled with a scrambling sequence having the length of 62, which is determined by the cell identification sequence allocated to the primary synchronization channel.

$P_{j,1}$ is the scrambling sequence that scrambles the first short sequence and the second short sequence, and $P_{j,2}$ is the scrambling sequence that scrambles the third short sequence and the fourth short sequence. The scrambling sequences $P_{j,1}$ and $P_{j,2}$ are represented as $P_{j,1} = [P_{j,1}(0), P_{j,1}(1), \ldots, P_{j,1}(k), \ldots, P_{j,1}(61)]$, and $P_{j,2} = [P_{j,2}(0), P_{j,2}(1), \ldots, P_{j,2}(k), \ldots, P_{j,2}(61)]$.

Here, j (j=0, 1, 2) is the number of the cell identification sequence allocated to the primary synchronization channel. Accordingly, the scrambling sequences $P_{j,1}$ and $P_{j,2}$ are determined by the number of the cell identification sequence allocated to the primary synchronization channel.

According to the third method of generating the secondary synchronization signal, the first sequence $c_0$ is as indicated in Equation 9, the second sequence $c_1$ is as indicated in Equation 10, the third sequence $c_2$ is as indicated in Equation 11, and the fourth sequence $C_3$ is as indicated in Equation 12.

$$c_0 = [w0(0)P_{j,1}(0), w0(1)P_{j,1}(1), \ldots, w0(k)P_{j,1}(k), \ldots, w0(30)P_{j,1}(30)] \quad \text{(Equation 9)}$$

$$c_1 = [w1(0)S_{w0}(0)P_{j,1}(31), \ldots, w1(1)S_{w0}(1)P_{j,1}(32), w1(m)S_{w0}(m)P_{j,1}(31+m), \ldots, w1(30)S_{w0}(30)P_{j,1}(61)] \quad \text{(Equation 10)}$$

$$c_2 = [w2(0)P_{j,2}(0), w2(1)P_{j,2}(1), \ldots, w2(k)P_{j,2}(k), \ldots, w2(30)P_{j,2}(30)] \quad \text{(Equation 11)}$$

$$c_3 = [w3(0)S_{w2}(0)P_{j,2}(31), w3(1)S_{w2}(1)P_{j,2}(32), \ldots, w3(m)S_{w2}(m)P_{j,2}(31+m), \ldots, w3(30)S_{w2}(30)P_{j,2}(61)] \quad \text{(Equation 12)}$$

In Equation 9 to Equation 12, k denotes the index of the even-numbered sub-carriers to be used for the secondary synchronization channel, and m denotes the index of the odd-numbered sub-carriers to be used for the secondary synchronization channel.

The frequency mapping unit 430 generates the downlink frame by mapping the secondary synchronization signal that are generated from the synchronization signal generating unit 420, and transmission traffic data to the time and frequency domains S530.

The OFDM transmitting unit 440 receives the downlink frame from the frequency mapping unit 430 and transmits the downlink frame through given transmission antenna S540.

A method of searching cells by the mobile station by using the downlink frame generated by the exemplary embodiment of the present invention will now be described with reference to FIG. 9 and FIG. 11.

Figure 9:
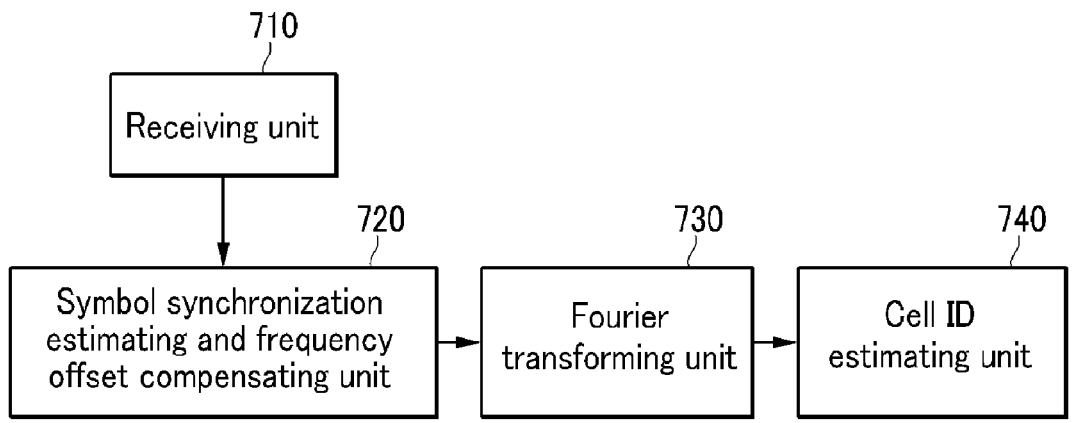
FIG. 9 is a block diagram of an apparatus for searching cells according to an exemplary embodiment of the present invention.
Figure 10:
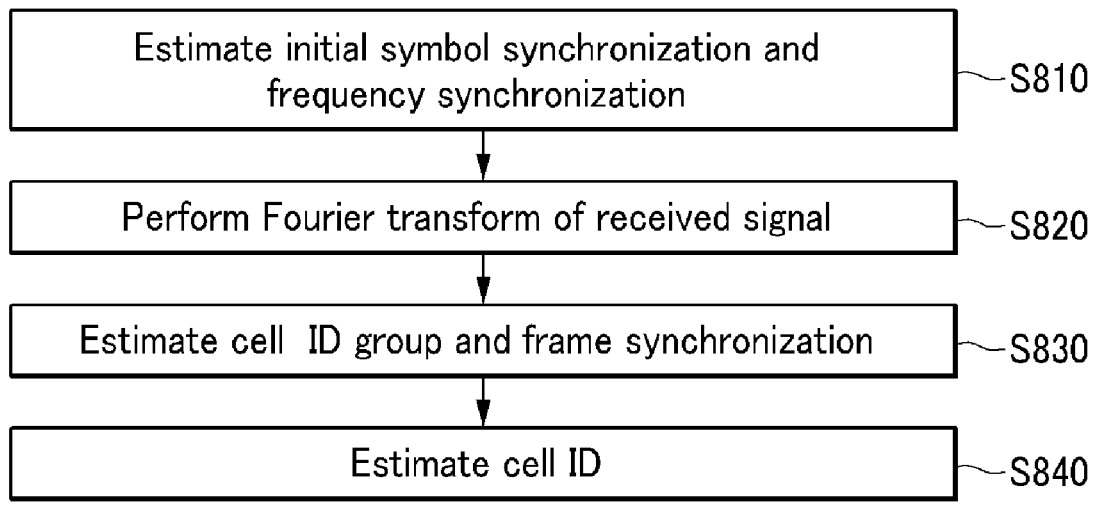
FIG. 10 is a flowchart illustrating a method of searching a cell according to a first exemplary embodiment of the present invention.
Figure 11:
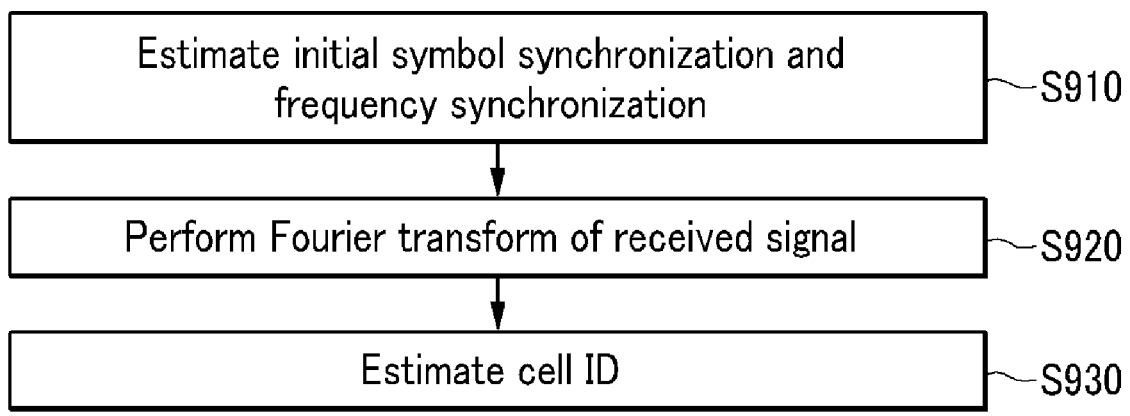
FIG. 11 is a flowchart illustrating a method of searching a cell according to a second exemplary embodiment of the present invention.

FIG. 9 is a block diagram of an apparatus for searching cells according to the exemplary embodiment of the present invention, FIG. 10 is a flowchart illustrating a cell searching method according to a first exemplary embodiment of the present invention, and FIG. 11 is a flowchart illustrating a cell searching method according to a second exemplary embodiment of the present invention.

As shown in FIG. 9, the apparatus for searching the cells according to the exemplary embodiment of the present invention includes a receiving unit 710, a symbol synchronization estimating and frequency offset compensating unit 720, a Fourier transforming unit 730, and a cell ID estimating unit 740.

A cell searching method according to the first exemplary embodiment of the present invention will now be described with reference to FIG. 10.

As shown in FIG. 10, the receiving unit 710 receives the frames transmitted from the base station, and the symbol synchronization estimating and frequency offset compensating unit 720 filters the received signal by as much as a bandwidth allocated to the synchronization channel and acquires the symbol synchronization by respectively correlating the filtered received signal and a plurality of known primary synchronization signals, and compensates the frequency offset by estimating frequency synchronization (S810). The symbol synchronization estimating and frequency offset compensating unit 720 respectively correlates the filtered received signal and the plurality of known primary synchronization signals and estimates a time of the largest correlation value as the symbol synchronization, and transmits a number of a primary synchronization signal having the largest correlation value to the cell ID estimating unit 740. At this time, the frequency offset may be compensated in the frequency domain after performing the Fourier transform.

The Fourier transforming unit 730 performs Fourier transform of the received signals on the basis of the symbol synchronization estimated by the symbol synchronization estimating and frequency offset compensating unit 720 (S820).

The cell ID estimating unit 740 estimates a cell ID group and frame synchronization by respectively correlating the Fourier transformed received signal with a plurality of known secondary synchronization signals S830. The cell ID estimating unit 740 respectively correlates a plurality of secondary synchronization signals with the Fourier transformed received signal, and estimates the frame synchronization and the cell ID group by using a secondary synchronization signal that has the largest correlation value. Herein, the plurality of secondary synchronization signals are given by applying $P_{j,0,1}$, $P_{j,0,2}$, $P_{j,1,1}$ and $P_{j,1,2}$ that are determined in accordance with a primary synchronization signal that corresponds to the number of a primary synchronization signal transmitted from the symbol synchronization estimating and frequency offset compensating unit 720 to Equation 5 to Equation 8, At this time, in the case that a synchronization channel symbol exists in one slot or one OFDM symbol within one frame, the symbol synchronization becomes frame synchronization, and therefore, it is not necessary to additionally acquire frame synchronization.

In addition, the cell ID estimating unit 740 estimates cell IDs by using the number of a primary synchronization signal transmitted from the symbol synchronization estimating and frequency offset compensating unit 720 and the estimated cell ID group S840. At this time, the cell ID estimating unit 740 estimates the cell ID with reference to a known mapping relationship between cell ID, the cell ID group, and a number of primary synchronization signal.

The estimated cell ID information may be verified by using scrambling sequence information included in the pilot symbol duration.

A cell searching method according to the second exemplary embodiment of the present invention will now be described with reference to FIG. 11.

As shown in FIG. 11, the receiving unit 710 receives a frame transmitted from the base station, and the symbol synchronization estimating and frequency offset compensating unit 720 filters the received signal by as much as a bandwidth allocated to the synchronization channel and acquires the symbol synchronization by respectively correlating the filtered received signal and a plurality of known primary synchronization signals, and compensates the frequency offset by estimating frequency synchronization S910. The symbol synchronization estimating and frequency offset compensating unit 720 respectively correlates the filtered received signal and the plurality of known primary synchronization signals and estimates a time of the largest correlation value as the symbol synchronization, and transmits a plurality of correlation values of the plurality of known primary synchronization signals and filtered received signal to the cell ID estimating unit 740. At this time, the frequency offset compensation may be performed in the frequency domain after Fourier-transformed.

The Fourier transforming unit 730 Fourier-transforms the received signal with reference to the symbol synchronization that is estimated by the symbol synchronization estimating and frequency offset compensating unit 720 S920.

The cell ID estimating unit 740 estimates cell IDs by using the plurality of correlation values transmitted from the symbol synchronization estimating and frequency offset compensating unit 720, and correlation values of the Fourier-transformed received signal and a plurality of known secondary synchronization signals S930. The cell ID estimating unit searches a secondary synchronization signal having the largest correlation value by correlating each of the plurality of known secondary synchronization signals with the Fourier-transformed received signal for each of the plurality of known primary synchronization signals. Here, the plurality of secondary synchronization signals are given by applying $P_{j,0,1}$, $P_{j,0,2}$, $P_{j,1,1}$ and $P_{j,1,2}$ that are determined in accordance with the corresponding primary synchronization signal to Equation 5 to Equation 8.

In addition, the cell ID estimating unit 740 combines the correlation value of each known primary synchronization signal transmitted from the symbol synchronization estimating and frequency offset compensating unit 720 and the correlation value of the secondary synchronization signal having the largest correlation value for each of the plurality of known primary synchronization signals.

The cell ID estimating unit 740 estimates frame synchronization and a cell ID group by using a secondary synchronization signal having the largest combined value among the combined values of the correlation values of a primary synchronization signal and a secondary synchronization signal. In addition, the cell ID estimating unit 740 estimates a cell ID by using the primary synchronization signal having the largest combined value and the estimated cell ID group. At this time, the cell ID estimating unit 740 estimates the cell ID with reference to a known mapping relationship between the cell ID group, cell ID and the primary synchronization signal number.

The exemplary embodiment of the present invention can be not only implemented by the above-described apparatus and/or method, but can be implemented by, for example, a program that achieves the function corresponding to the configuration of the exemplary embodiment of the present invention and a recording medium in which the program is recorded. This will be easily implemented from the above-described exemplary embodiment of the present invention by those skilled in the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of searching a cell by a mobile station, comprising:
    receiving a downlink frame including a primary synchronization signal and two secondary synchronization signals which are different from each other; and
    identifying a cell by using the primary synchronization signal and at least one of the two secondary synchronization signal, wherein,
    in one secondary synchronization signal of the two secondary synchronization signal, a first short sequence scrambled with a first scrambling sequence and a second short sequence scrambled with a second scrambling sequence and a third scrambling sequence are alternately disposed on a plurality of sub-carriers,
    in the other secondary synchronization signal of the two secondary synchronization signal, the second short sequence scrambled with the first scrambling sequence and the first short sequence scrambled with the second scrambling sequence and a fourth scrambling sequence are alternately disposed on a plurality of sub-carriers, and
    the first short sequence and the second short sequence indicate cell group information,
    the first scrambling sequence and the second scrambling sequence are determined based on the primary synchronization signal, the third scrambling sequence is determined based on the first short sequence, and the fourth scrambling sequence is determined based on the second short sequence.

2. The method of claim 1, wherein the first scrambling sequence and the second scrambling sequence are different from each other.

3. The method of claim 1, wherein the identifying of the cell comprises:
    identifying a cell group by using at least one of the two secondary synchronization signals; and
    identifying the cell in the cell group by using the primary synchronization signal.

4. The method of claim 1, wherein:
    the downlink frame includes a plurality of slots, each slot having a plurality of symbols; and
    the primary synchronization signal is located on a last symbol of a slot, and the two secondary synchronization signal is located on a symbol right ahead of the last symbol of the slot.

5. An apparatus for searching a cell by a mobile station, comprising a hardware processor configured to execute:
    receiving a downlink frame including a primary synchronization signal and two secondary synchronization signals which are different from each other; and
    identifying a cell by using the primary synchronization signal and at least one of the two secondary synchronization signals, wherein, in one secondary synchronization signal of the two secondary synchronization signal, a first short sequence scrambled with a first scrambling sequence and a second short sequence scrambled with a second scrambling sequence and a third scrambling sequence are alternately disposed on a plurality of sub-carriers, and
    in the other secondary synchronization signal of the two secondary synchronization signal, the second short sequence scrambled with a first scrambling sequence and the first short sequence scrambled with the second scrambling sequence and a fourth scrambling sequence are alternately disposed on a plurality of sub-carriers, and
    the first short sequence and the second short sequence indicate cell group information,
    the first scrambling sequence and the second scrambling sequence are determined based on the primary synchronization signal, the third scrambling sequence is determined based on the first short sequence and the fourth scrambling sequence is determined based on the second short sequence.

6. The apparatus of claim 5, wherein the first scrambling sequence and the second scrambling sequence are different from each other.

7. The apparatus of claim 5, wherein:
    the downlink frame includes a plurality of slots, each slot having a plurality of symbols; and
    the primary synchronization signal is located on a last symbol of a slot, and the two secondary synchronization signal is located on a symbol right ahead of the last symbol of the slot.

* * * * *